United States Patent [19]

Kim et al.

[11] Patent Number: 4,824,536
[45] Date of Patent: Apr. 25, 1989

[54] METHOD FOR PROCESSING COLD-ROLLED STAINLESS-STEEL SHEET AND STRIP

[75] Inventors: Yeong-U Kim, Export; Donald R. Zaremski, Cheswick, both of Pa.

[73] Assignee: Allegheny Ludlum Corporation, Pittsburgh, Pa.

[21] Appl. No.: 207,083

[22] Filed: Jun. 15, 1988

[51] Int. Cl.$^4$ .............................................. C25F 1/06
[52] U.S. Cl. ................................................ 294/145 R
[58] Field of Search ................. 204/140, 141.5, 145 R

[56] References Cited

U.S. PATENT DOCUMENTS

| | | | |
|---|---|---|---|
| 2,902,572 | 9/1959 | Lackner | 219/10.41 |
| 3,444,346 | 5/1969 | Russell et al. | 219/10.61 |
| 4,054,770 | 10/1977 | Jackson et al. | 219/10.61 |
| 4,363,709 | 12/1982 | Zaremski | 204/145 |
| 4,585,916 | 4/1986 | Rich | 219/10.61 |
| 4,678,883 | 7/1987 | Saitoh et al. | 219/10.61 |

*Primary Examiner*—T. M. Tufariello
*Attorney, Agent, or Firm*—Patrick J. Viccaro

[57] ABSTRACT

A method is provided for further processing cold-rolled, stainless-steel sheet or strip by being induction-heated to an annealing temperature in the range of up to 2300 degrees Fahrenheit, causing the formation thereon of a scale of having thickness of less than 2000 Angstroms, followed by electrolytic descaling at high current density in an aqueous solution of 15 to 25 weight percent of sodium sulfate, maintained at a temperature of at least 150 degrees Fahrenheit.

11 Claims, 1 Drawing Sheet

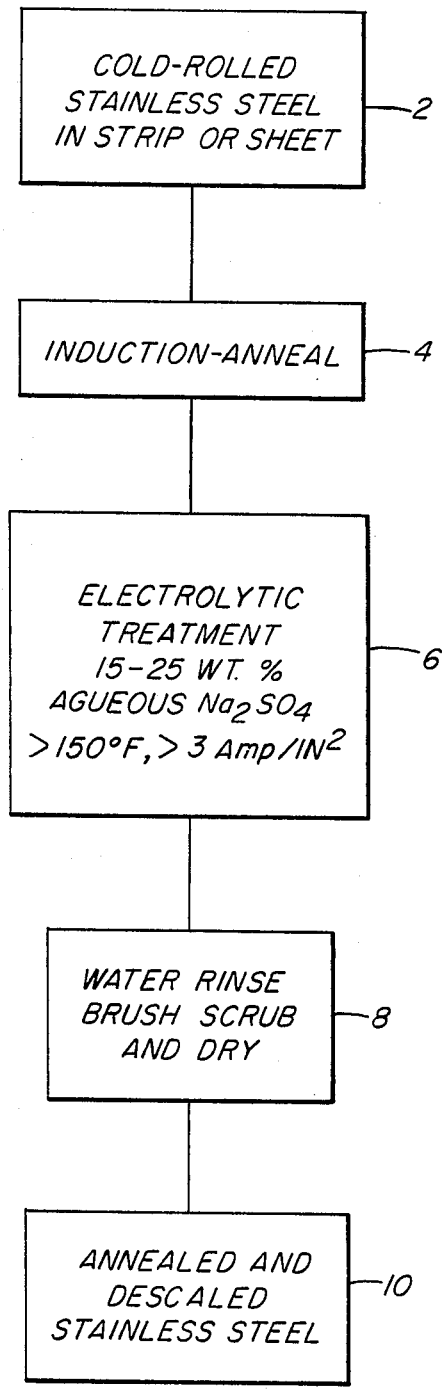

METHOD FOR PROCESSING COLD-ROLLED STAINLESS-STEEL SHEET AND STRIP

BACKGROUND OF THE INVENTION

1. Field of the Invention

This invention relates to the processing of cold-rolled stainless-steel sheet or strip, and in particular, to a method of annealing and then descaling that product.

2. Description of the Prior Art

In the manufacture of flat-rolled stainless-steel sheet and strip products, it is necessary to anneal or soften the material, subsequent to the cold-rolling operation. One very common annealing practice involves heating the steel in an oxidizing furnace atmosphere to a temperature at which oxide surface scale readily forms. Such heating, to a temperature typically in the range of 1450 degrees Fahrenheit to 2150 degrees Fahrenheit (788 degrees Centigrade to 11177 degrees Centigrade), depending upon the chemical composition of the steel being processed, is commonly done in a refractory-lined, gas-fired furnace containing an oxidizing atmosphere, and such treatment typically results in the formation on the stainless steel of an oxide scale having a thickness in the range of 4000 Angstroms to several microns. Such a scale must ultimately be removed before the product is considered ready for sale. To accomplish this, according to the prior art, any of several different descaling processes may be used, alone or in combination, and among these known processes there are (1) shot blasting following by acid pickling, (2) conditioning the scale by immersing the product in molten salt or subjecting it to an electrolytic treatment, followed by acid pickling, and (3) straight acid pickling. The acids commonly used in the pickling operation include sulfuric, nitric, and nitric-hydrofluoric combinations. The use of such acids is disadvantageous and costly, not only because the acids themselves are not cheap but also because they are hazardous materials which necessitate the use of special handling techniques before, during, and after their use; moreover, because of environmental regulations, the disposal of waste pickle liquor presents costly problems.

The prior art also contains U.S. Pat. No. 4,363,709, which discloses the removal of oxide scale from the surface of a metallic body of stainless steel, with the use of a high-current-density electrolytic descaling process in a bath consisting of an aqueous solution containing about 15 to 25 weight percent of sodium sulfate, maintained at a temperature of at least 150 degrees Fahrenheit (65.6 degrees Centigrade). According to the above-mentioned patent, the stainless steel is subjected as the anode to the action of a direct electric current for at least 10 seconds at a current density of at least 3 amperes per square inch (46.5 Amps/dm$^2$).

The prior art contains, moreover, a group of patents which are concerned with the problem of providing heat to metal strip or sheet material by means of electrical induction. This prior art includes, for example, the following U.S. Pat. Nos.: 4,054,770; 4,585,916; 3,444,346; 2,902,572; and 4,678,883. These patents may be considered as relating to such an electromagnetic induction process called "transverse flux induction heating".

There have been factors which would lead persons skilled in the art to seek to substitute induction heating for the conventional gas-fired heating in a refractory-lined furnace with an oxidizing atmosphere. It has been apparent to those skilled in the art that if this can be done, the heating should be more rapid and efficient, possibly causing the development of the desired annealing with the development of an oxide scale of lesser thickness because of a decreased time at high temperature. At the same time, however, those skilled in the art have also appreciated that there are considerable practical difficulties which have tended to make this apparently desirable substitution difficult or impossible.

For example, there has been the problem that unless particular measures are taken to decrease the amount of magnetic flux applied in the vicinity of the edges of the strip or sheet, uneven heating develops, with the unwanted result that when an attempt is made to commercially process stainless-steel strip at a satisfactory throughput rate, intolerable buckling or cobbling of the strip being processed is encountered.

Moreover, the known gas-fired processes are capable of handling stainless-steel strip in a variety of strip widths without it being necessary to make any other important adjustments in the process parameters. With the induction heating, a change from one known commercial width to another, and a change in the composition in the stainless steel being processed, requires further experimentation to determine another satisfactory set of operating conditions.

The state of the prior art has been such that those skilled in the art have not been aware that it is indeed feasible to practice a method for the processing of cold-rolled stainless steel sheet or strip, providing the annealing and subsequent descaling thereof by a combination of induction heating and subsequent modified electrolytic treatment in sodium sulfate solution, such that when properly performed, the requirements for subsequent pickling can be entirely avoided.

SUMMARY OF THE INVENTION

Cold-rolled stainless-steel sheet or strip is further processed by being induction-heated to an annealing temperature in the range of up to 2300 degrees Fahrenheit (1260 Degrees Centigrade), causing with the formation thereon of a scale having thickness of 2000 angstroms or less, followed by electrolytic descaling at high current density in an aqueous solution of 15 to 25 weight percent of sodium sulfate, maintained at a temperature of at least 150 degrees Fahrenheit (66 degrees Centigrade) for a time sufficient to substantially entirely descale the steel.

DESCRIPTION OF THE DRAWINGS

A complete understanding of the invention may be obtained from the foregoing and following description thereof, taken together with the appended drawing, in which the sole FIGURE is a flow diagram of a process according to the invention.

DESCRIPTION OF THE PREFERRED EMBODIMENTS

With reference to the sole figure the process or method according to the invention may be explained beginning with the block 2, the starting material, preferably cold-rolled stainless steel in the form of strip or sheet. Such stainless steel may be of either austenitic nature (e.g., AISI Type 304) or ferritic nature (e.o., AISI Type 430). Such sheet or strip typically has a thickness of 0.008 to 0.02 inch (0.2032 to 0.508 mm) and on the order of 0.012 inch (0.0348 mm) and comes in various sheet widths on the order of 24 to 40 inches (61 to 101.6 cm). Although the process of the present invention may obviously be performed upon a succession of individual sheets, those skilled in the art will appreciate that it is more efficient to operate upon a continuous strip or web. The cold-rolled stainless steel needs to be annealed and descaled, in order to produce commercially salable stainless steel in sheet or strip form.

In accordance with the invention, the above-mentioned stainless sheet or strip is subjected to an induction-annealing operation, as indicated in the box 4 of the FIGURE. Those skilled in the art will understand that this step involves heating the steel to a suitable annealing temperature, such as 1450 degrees Fahrenheit to 2300 degrees Fahrenheit (788 to 1260 Degrees Centigrade), depending upon the chemical composition of the steel being treated, by means of a process of transverse-flux induction heating of a kind indicated as being known to those skilled in the art from the above-mentioned U.S. Pat. Nos. 4,054,770; 4,585,916; 3,444,346; 2,902,572; and 4,678,883. For the purposes of the present invention and disclosure, it may be taken that it is within the skill of art to select an appropriate combination of impressed frequency and power, together with suitable use of shielding and shaping of polepieces in order to achieve, at a satisfactory rate of throughput, a satisfactory heating of the stainless-steel sheet or strip involved, with the avoidance of the generation of uneven temperatures such as might cause cobbling or buckling. Stainless steel sheet that has been so heated may thereafter be either water-quenched or air-cooled.

The induction-anneal treatment of the box 4 results in a stainless-steel product having thereon an oxide scale having a thickness of less than 2000 angstroms, particularly on the order of 700 to 1400 Angstroms, which is approximately one-third the oxide-scale thickness obtained when similar steel is heated for annealing in a typical gas-fired refractory-lined furnace. Those skilled in the art will understand that a typical annealing operation is conducted in a gas-fired atmosphere which tends to oxidize the stainless-steel sheet or strip unless special measures have been taken to provide a neutral or reducing atmosphere during the typical annealing operation. Such special measures could make the typical annealing operation prohibitively expensive.

In the next step of the process of the invention as indicated, in the box 6 of the FIGURE, the stainless-steel strip is subjected to electrolytic treatment in a bath of 15 to 25 weight percent of aqueous sodium sulfate maintained at a temperature above 150 degrees Fahrenheit (66 degrees Centigrade) and with the use of a current density above 3 amperes per square inch (46.5 amperes/dm$^2$). Preferably the strip is subjected as an anode to a D.C. (direct current) for at least 10 seconds. Such an electrolytic descaling treatment is disclosed and discussed in the above-mentioned U.S. Pat. No. 4,363,709. In accordance with the present invention, however, it is found that in view of the lesser oxide-scale thickness which is produced in the induction anneal of box 4, the combination of treatment conditions used (concentration of sodium sulfate, bath temperature, impressed current density, and duration of treatment) may be modified somewhat in the direction of being less severe, and still it will be possible to obtain, without resort to any subsequent acid-pickling step, a product from which the scale has been adequately, i.e., substantially totally, removed. Thus, in accordance with the invention, the stainless steel is subjected further to a rinsing with water, brush-scrubbing and drying, as indicated in the box 8, resulting in the production of suitably annealed and descaled stainless-steel, as indicated in box 10.

The invention explained above is further illustrated by the following specific examples.

EXAMPLE 1

AISI Type 304 stainless-steel strip, 0.012 inches thick, was induction-heated for annealing to a temperature of 1850 degrees Fahrenheit (1010 degrees Centigrade) and then air-cooled. It was subsequently subjected to an electrolytic descaling treatment at 3 amperes per square inch (46.5 amps/dm$^2$) for a time of 15 seconds in an aqueous bath containing 20 weight percent of sodium sulfate maintained at 160 degrees Fahrenheit (71 degrees Centigrade). The oxide thickness, as annealed, was 700 Angstroms, and after the electrolytic descaling treatment the oxide thickness was determined to be 35 angstroms. After being water rinsed, brush-scrubbed and dried, the product comprised satisfactorily annealed and descaled stainless-steel strip.

EXAMPLE 2

Example 1 was repeated, except that in the electrolytic descaling treatment, the current density was 3.5 amperes per square inch (54.3 A/dm$^2$). The results were the same as Example 1, i.e. satisfactorily descaled.

EXAMPLE 3

Example 1 was repeated, except that the steel was AISI Type 430, and the annealing temperature was 1508 degrees Fahrenheit (820 degrees Centigrade), following which the stainless-steel strip was water-quenched instead of air-cooled. The results were substantially the same; the oxide thickness of the scale, after annealing, was 900 Angstroms, and after the electrolytic descaling it was 52.5 Angstroms.

EXAMPLE 4

Example 3 was repeated, except that a current density of 3.5 amperes per square inch (54.3 amps/dm$^2$) was used in the descaling treatment, and the results were substantially the same, except that the oxide thickness after electrolytic descaling was 35 Angstroms.

In additional experimental work on stainless-steel strip of the grades of AISI Type 304 and AISI Type 430, the oxide thicknesses of scale were obtained when different induction-annealing temperatures were used. For example, using an annealing temperature of 2057 degrees Fahrenheit (1125 degrees Centigrade) on AISI Type 304 austenitic stainless-steel strip having a thickness of 0.012 inch (0.03 cm), oxide thicknesses in the range of 1200 to 1400 Angstroms were observed, whether the steel was air-cooled or water-quenched. With the same steel, but at an annealing temperature of 2021 degrees Fahrenheit (1105 degrees Centigrade), the oxide-scale thickness was observe to be 1200 to 1300 Angstroms. With AISI Type 430 ferritic stainless steel of the same thickness, strip annealed at 1472 degrees Fahrenheit (800 degrees Centigrade) and air-cooled an oxide thickness of approximately 1100 Angstroms was observed; when the annealing temperature was 1598 or 1697 degrees Fahrenheit (870 or 925 degrees Centigrade), oxide-scale thicknesses of 1000 to 1100 Angstroms were observed.

While we have shown and described herein certain embodiments of our invention, we intend to cover as well any change or modification therein which may be made without departing from its spirit and scope.

We claim as our invention:

1. A method of processing cold-rolled stainless steel in a form of a strip or a sheet, said method comprising:
    subjecting said steel to transverse-flux electrical-induction heating substantially uniformly across its width to an annealing temperature in the range of up to 2300 degrees Fahrenheit, thereby producing on said steel an oxide-scale thickness of 2000 Angstroms or less,
    electrolytically descaling said steel by subjecting it to the action of a bath consisting of essentially water plus 15 to 25 weight percent sodium sulfate maintained at a temperature in excess of 150 degrees Fahrenheit and with the use of current density over 3.0 amperes per square inch for a time sufficient to descale the steel substantially entirely, and
    then further processing said steel by brush-scrubbing, water-rinsing, and drying without the use of an acid-pickling treatment to produce an annealed and descaled stainless-steel product.

2. The method as defined in claim 1, wherein the annealing temperature ranges from about 1450 to 2300 degrees Fahrenheit.

3. The method as defined in claim 1, wherein the oxide scale thickness produced ranges from about 700 to 1400 angstroms.

4. The method as defined in claim 1, wherein the steel sheet or strip thickness ranges from 0.008 to 0.020 inch.

5. The method as defined in claim 1, wherein said steel is an austenitic stainless steel, and the annealing temperature employed is in the range of 1800 to 2100 degrees Fahrenheit.

6. The method as defined in claim 5, wherein the annealing temperature employed is in the range of 1800 to 1900 degrees Fahrenheit.

7. The method as defined in claim 5, said steel being AISI Type 304 stainless steel.

8. The method as defined in claim 1, wherein said steel is a ferritic stainless steel and the annealing temperature employed is in the range of 1450 to 1700 degrees Fahrenheit.

9. The method as defined in claim 8, wherein the annealing temperature is in the range of 1500 to 1550 degrees Fahrenheit.

10. The method as defined in claim 8, wherein said steel is AISI Type 430 stainless steel.

11. A method of processing cold-rolled stainless steel in a form of a strip or a sheet having a thickness of 0.008 to 0.020 inch, said method comprising:
    subjecting said steel to transverse-flux electrical-induction heating substantially uniformly across its width to an annealing temperature in the range of 1450 to 2300 degree Fahrenheit, thereby producing on said steel an oxide-scale thickness of 700 to 1400 Angstroms,
    electrolytically descaling said steel by subjecting it to the action of a bath consisting of essentially water plus 15 to 25 weight percent sodium sulfate maintained at a temperature in excess of 150 degrees Fahrenheit and wit the use of current density over 3.0 amperes per square inch for a time sufficient to descale the steel substantially entirely, and
    then further processing said steel by brush-scrubbing, water-rinsing, and drying without the use of an acid-pickling treatment to produce an annealed and descaled stainless-steel product.

* * * * *